United States Patent
Jeng

(10) Patent No.: US 7,197,166 B2
(45) Date of Patent: Mar. 27, 2007

(54) IRIS EXTRACTION METHOD CAPABLE OF PRECISELY DETERMINING POSITIONS AND SIZES OF IRISES IN A DIGITAL FACE IMAGE

(75) Inventor: Sheng-Wen Jeng, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 665 days.

(21) Appl. No.: 10/601,598

(22) Filed: Jun. 24, 2003

(65) Prior Publication Data
US 2004/0146187 A1    Jul. 29, 2004

(30) Foreign Application Priority Data
Jan. 23, 2003    (TW) ............................... 92101487 A

(51) Int. Cl.
*G06K 9/00*    (2006.01)
(52) U.S. Cl. .................... 382/118; 382/217; 382/215
(58) Field of Classification Search ............... 382/117, 382/217, 215; 340/5.52, 5.53, 5.82, 5.83
See application file for complete search history.

(56) References Cited

U.S. PATENT DOCUMENTS 5,291,560 A * 3/1994 Daugman ................. 382/117
6,920,237 B2 * 7/2005 Chen et al. ............... 382/117
2003/0016846 A1 * 1/2003 Chen et al. ............... 382/117

OTHER PUBLICATIONS

Xie (Automatic extraction and tracking of eye features from facial image sequences, Proquest, AAT 9434636, Chapter 4, 1994).*
Wang (Automatic eye feature extraction based on Hough transform and eyelid deformable template, SO Journal of Infrared and Millimeter Waves, Feb. 1999, vol. 18, No. 1, p. 53-60).*

* cited by examiner

*Primary Examiner*—Joseph Mancuso
*Assistant Examiner*—Claire Wang
(74) *Attorney, Agent, or Firm*—Bacon & Thomas, PLLC

(57) ABSTRACT

The present invention relates to an iris extraction method. In the method, two searching regions are defined in a face image. A deformable template match algorithm and an energy function are used to measure the energy of each pixel with different hypothetical circular templates within the searching region. Pixels with the same hypothetical radius having energies greater than a predetermined threshold are recorded as iris candidates, wherein the pixel having the maximal energy is recorded as first iris candidate. Further, it detects associated iris pairs from iris candidates in each searching region, records the lower iris candidate having the maximal energy of iris pairs as second iris candidate, and selects the best iris candidate from first iris candidate and second iris candidate. Finally, it designates the best iris candidate having the maximal energy of all best iris candidates with different hypothetical radius as the iris in the face image.

9 Claims, 7 Drawing Sheets

IRIS EXTRACTION METHOD CAPABLE OF PRECISELY DETERMINING POSITIONS AND SIZES OF IRISES IN A DIGITAL FACE IMAGE

BACKGROUND OF THE INVENTION

1. Field of the Invention

The present invention relates to the technical field of face recognition and, more particularly, to an iris extraction method.

2. Description of Related Art

Currently, in the technical field of face recognition used for analyzing and determining digital face images, the basic requirement is to determine the position or range of eyes in an image so as to continue subsequent processes of recognition. For example, in a full-face recognition, a rough position of eyes is required for aligning an untested image and a reference image. While with the development of information technology, the desired precision of recognition is getting stricter. For example, the conventional recognition method used for determining the direction of the user's sight needs not only the correct position of the center of eyes, but also the exact location of irises as an assistant. With reference to FIG. 1, there is shown an eye image 1. The annular area around the pupil 11 is an iris 12. The color of iris 12 differs from each other, which may be black, green, blue, or brown. The white area exposed in the surface of eyeball is a sclera 13.

Compared with skin color, irises are circular dark areas in a face image. Therefore, the most popular conventional methods used for extracting irises in the face image include the circle Hough transform (CHT) method, and the deformable template match (DTM) method.

In the conventional method, at first, two searching regions are roughly defined as a pair of eyes in an input image. Next, a predefined energy function is used for measuring the energy of each pixel in the searching region. Each pixel is taken as a center of a circle with a radius $r_i$ (i=1~n, $r_n$ is the maximal radius, $r_1$ is the minimal radius), so as to build a circular deformable template. The energy function can be expressed as follows:

$$Eg = \frac{1}{|C|} = \oint_C \phi(S)ds + \frac{1}{|A|} \int\int_A \psi(a)dxdy,$$

where $\phi(S)$ is an edge intensity of one of the pixels in the periphery of the circular template, $\psi(a)$ is a gray value of the pixel of input image within the range of the circular template. Usually, an original inputted gray-value image is required to obtain an edge map with the distribution of edge intensity by performing a contract operation, such as Sobel operators. Since a pixel has n energies due to n different sizes (radiuses) of circular templates, the maximal energy of a pixel is regarded as the energy of the pixel. Then, two pixels are respectively selected from two searching regions as positions of irises so as to finish the iris-positioning procedure, where each pixel is the one with the maximal energy of a plurality of pixels in the searching region.

However, generally, irises are partially visible in an input image in reality. Even though when the eyes look forward, only two-third irises are visible. Further, in most situations, eyelids may cover upper irises, especially when the eyeball is rotating or the eyes are looking sideways. Also, the uncertainty (e.g. uneven light) of photo environment and the local circular-like dark areas of surrounding objects (e.g. eyebrows, eyeglasses, and hair) may lead to misjudge the eyebrows or glasses as best positions of irises according to conventional method. Therefore, it is desirable to provide an improved iris extraction method to mitigate and/or obviate the aforementioned problems.

SUMMARY OF THE INVENTION

An object of the present invention is to provide an iris extraction method in which a modified deformable template match (DTM) algorithm with improved energy function and measurement way is used, thereby the positions and sizes of irises in a digital face image can be precisely determined.

Another object of the present invention is to provide an iris extraction method in which the selected iris candidates in image search regions are paired with each other for determining precise positions of irises, thereby reducing the interference of other objects.

To achieve the objects, the iris extraction method of the present invention comprises the steps of: (A) defining two searching regions in a face image, wherein each searching region is a rough position of an eye for locating an iris; (B) measuring an energy of each pixel within the searching region according to a deformable template match (DTM) algorithm and an energy function, wherein each pixel is a center of a plurality of hypothetical circular templates each having a hypothetical radius between a maximal radius and a minimal radius for measuring the energies of the hypothetical circular templates in the face image; (C) recording the pixels with the same hypothetical radius having energies greater than a threshold as iris candidates, and recording a pixel having the maximal energy from the iris candidates as a first iris candidate; (D) comparing two of the iris candidates in each searching region for detecting a plurality of associated iris pairs, and recording the lower iris candidate having the maximal energy of the iris pairs as a second iris candidate; (E) selecting the pixel corresponding to the second iris candidate as a best iris candidate if the distance between the first iris candidate and the second iris candidate is smaller than a predetermined radius; and (F) designating the best iris candidate having the maximal energy of all best iris candidates with different hypothetical radius as an iris in the face image. Further, if none of the associated iris pairs is detected from the iris candidates, the first iris candidate is designated as the best iris candidate in the face image. And the center and radius of the designated best iris candidate is the desired iris.

Other objects, advantages, and novel features of the invention will become more apparent from the following detailed descriptions when taken in conjunction with the accompanying drawings.

DETAILED DESCRIPTION OF THE PREFERRED EMBODIMENT

Figure 1:
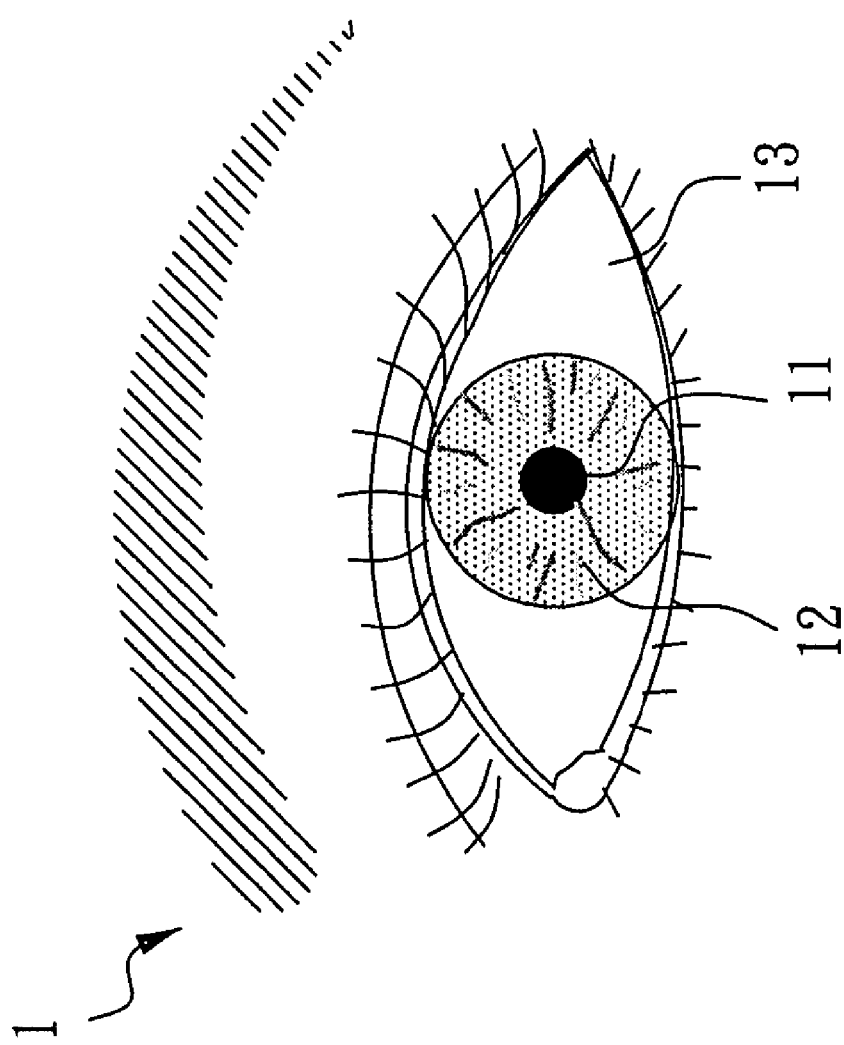
FIG. 1 is a schematic drawing of an eye.
Figure 2:
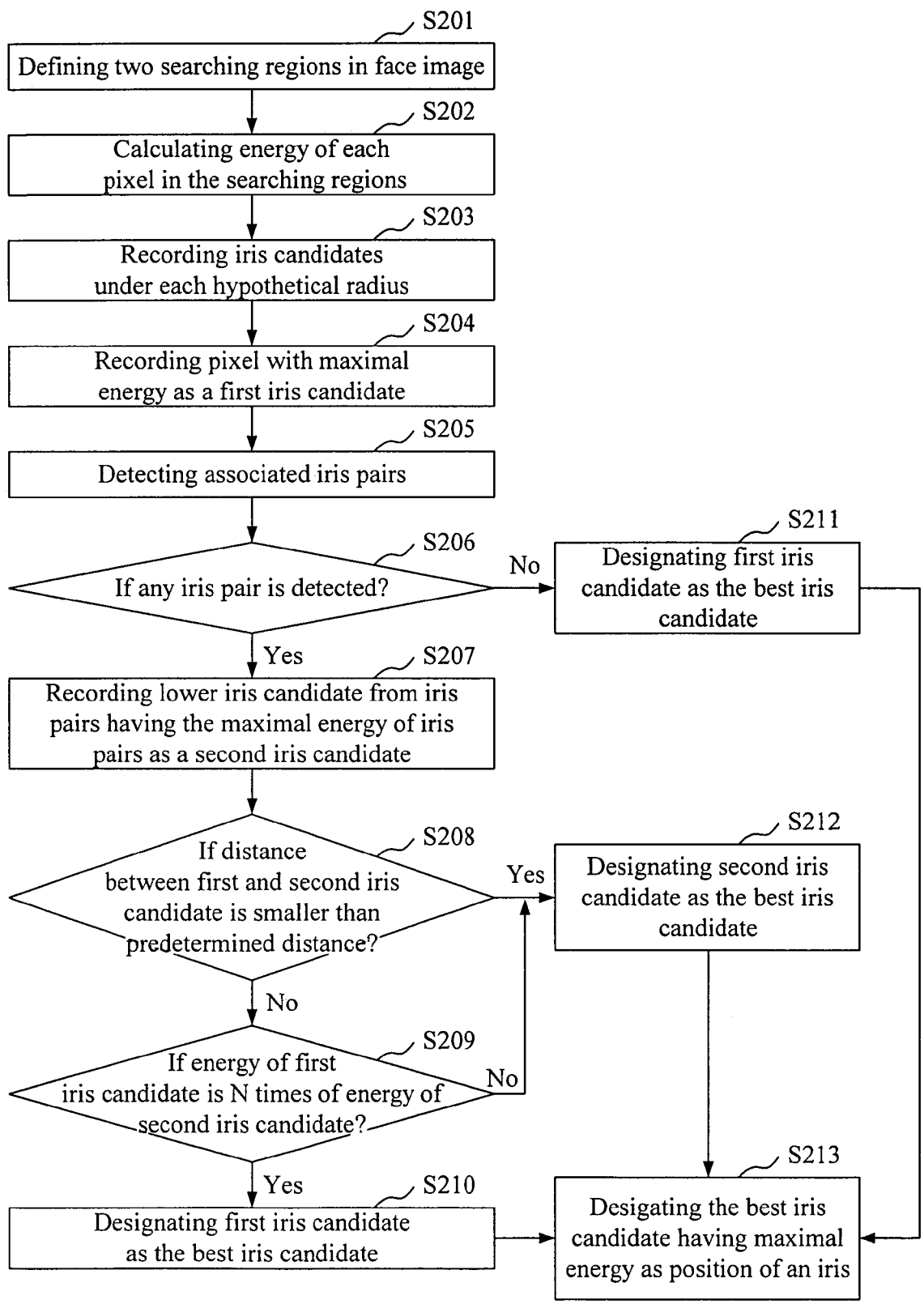
FIG. 2 is a flow chart according to the invention.
Figure 3:
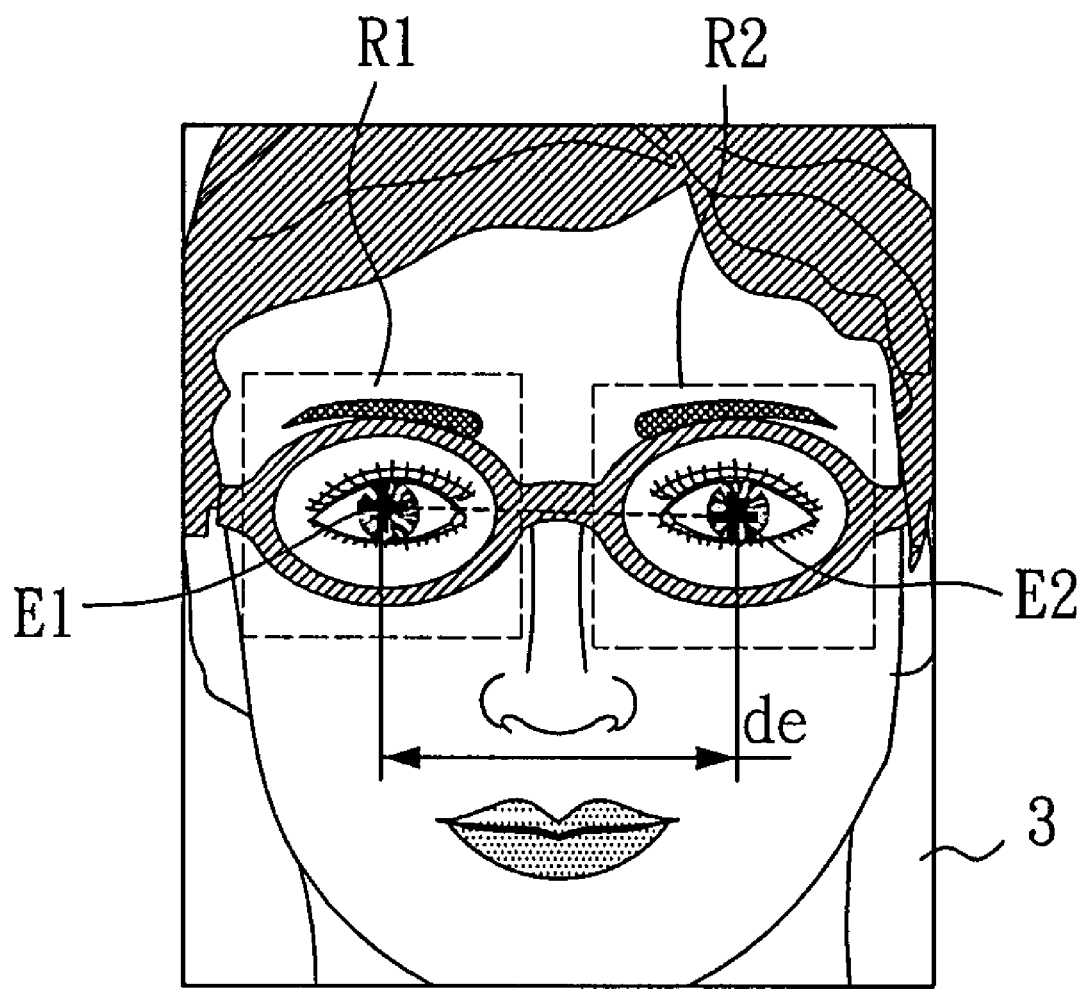
FIG. 3 is a schematic drawing of a face image according to the invention.

With reference to FIGS. 2 and 3, there are shown a flow chart and a face image, respectively, according to the present invention. At first, an image-process device obtains the range of a face image 3 by applying conventional face detection algorithm, and roughly detects the positions of two eyes E1, E2. In this embodiment, two searching regions R1, R2 are defined as a rectangle with the length of 0.8 time of the distance $d_e$ (i.e. $0.8 \times d_e$) between eyes E1, E2 and the width of 0.6 time of the distance $d_e$ (i.e. $0.6 \times d_e$) (step S201). Thus the image-process device can locate the positions of irises in searching regions R1, R2.

Figure 4:
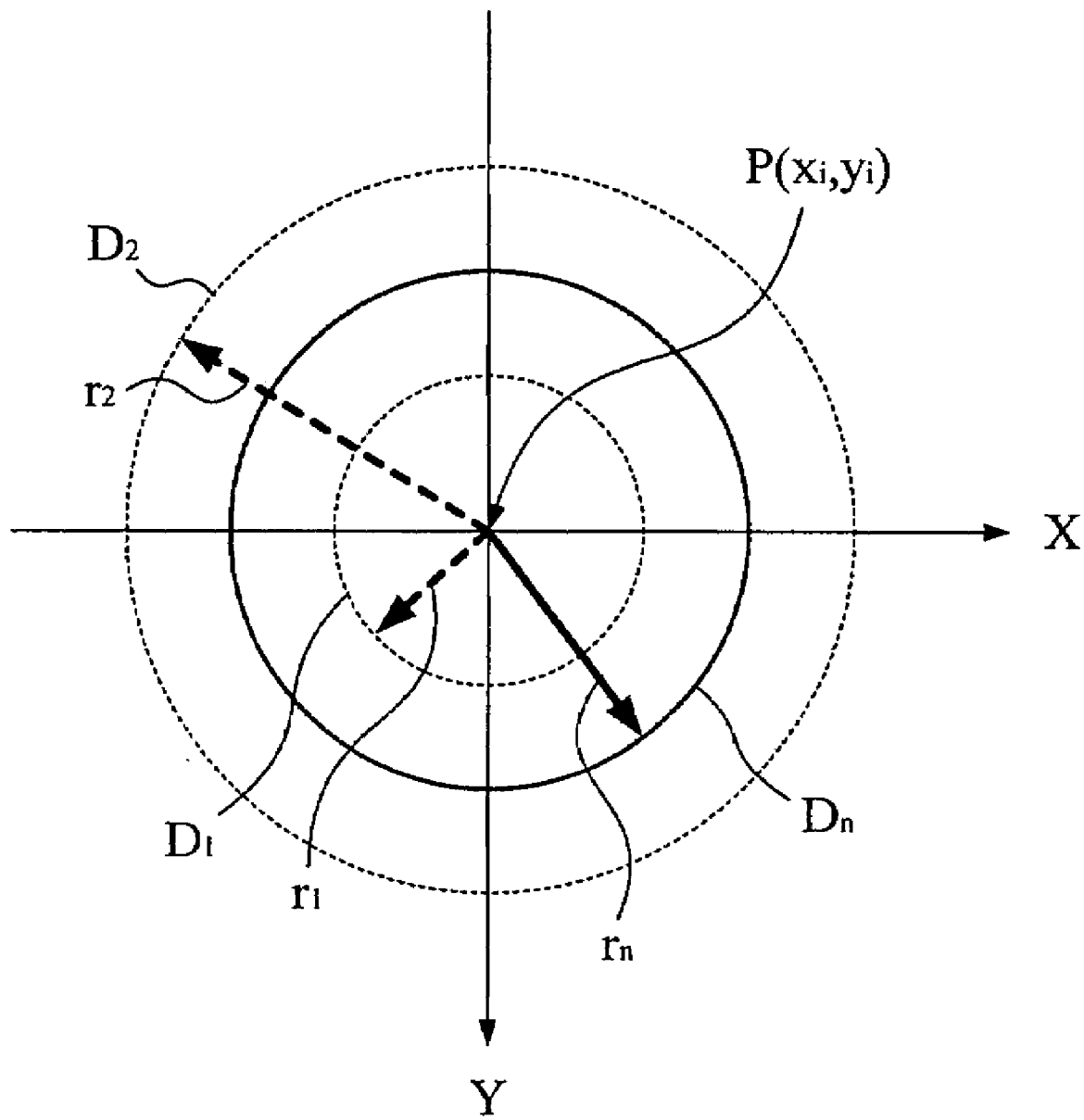
FIG. 4 is a schematic drawing of a circular deformable template according to the invention.

Due to the approximately circular-shaped iris, a deformable template match (DTM) technique is used to define a circular deformable template as shown in FIG. 4 in this embodiment. Each circular deformable template is applied in each pixel in searching regions R1, R2 so as to calculate the energy of each pixel according to an energy function (step S202). The hypothetical radius $r_n$ of the hypothetical circular template $D_n$ is between a minimal radius $r_1$ and a maximal radius $r_2$. In this embodiment, the minimal radius $r_1$ is 0.08 time of the distance $d_e$ (i.e. $r_1=0.08 \times d_e$) between eyes E1, E2 and the maximal radius is 0.13 time of the distance $d_e$ (i.e. $r_2=0.13 \times d_e$). A plurality of hypothetical circular templates $D_n$, each with the size between a minimal circular template $D_1$ and a maximal circular template $D_2$, are constructed while a pixel $P(x_i, y_i)$ (i∈R1 or R2) is taken as a basis point. Therefore, the energy of each pixel under a plurality of different circular templates can be obtained according to the following energy function:

$$Eg = \frac{1}{|C|} \oint_C \phi(S) ds,$$

where C is a periphery of the hypothetical radius $r_n$, ds is an increment of the periphery along the hypothetical circular template $D_n$, $\phi(S)$ is a measurement value of a sampling point on the periphery, |C| is the perimeter of the hypothetical circular template $D_n$.

Figure 5:
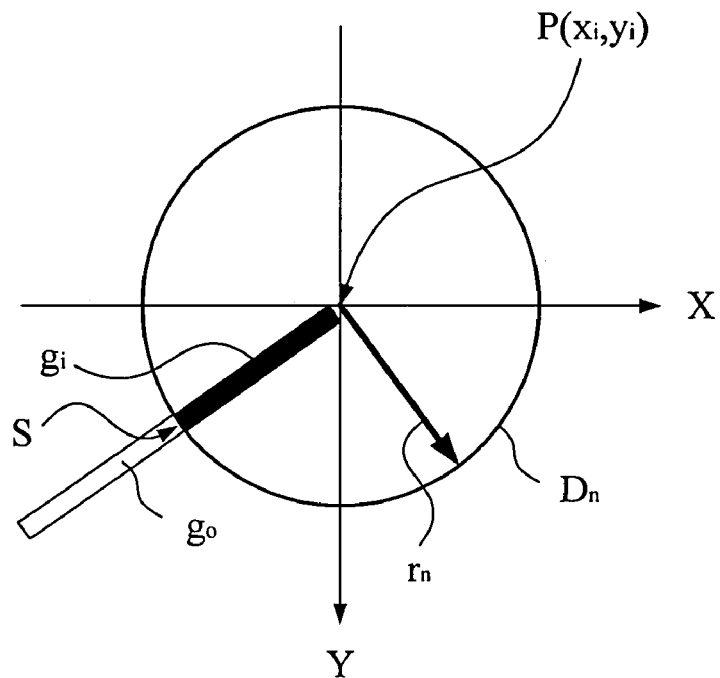
FIG. 5 schematically illustrating measurement values extracted from the hypothetical circular template according to the invention.

FIG. 5 illustrates the definition of the measurement value of each sampling point. The measurement value of the sampling point S in this embodiment is as follows:

$$\phi(S) = 1.5 \phi_e(S) + \phi_g(S),$$

where $\phi_e(S) = w(s)(g_o - g_i)$ is a measurement value of a contrast between an outer intensity and an inner intensity of the periphery of the hypothetical circular template $D_n$, $\phi_g(S) = 0.1 \times (255 - g_i)$ is a measurement value of the inner dark degrees of the hypothetical circular template $D_n$, $g_i$ is a gray-scale mean of the image inside a scanning line with the length equal to the hypothetical radius $r_n$ and the midpoint located on the periphery, $g_o$ is a gray-scale mean of the image outside the scanning line, w(s) is a weighting factor of the sampling point, and $\phi(S)$ is a weighting summation of $\phi_e(S)$ and $\phi_g(S)$.

Figure 6:
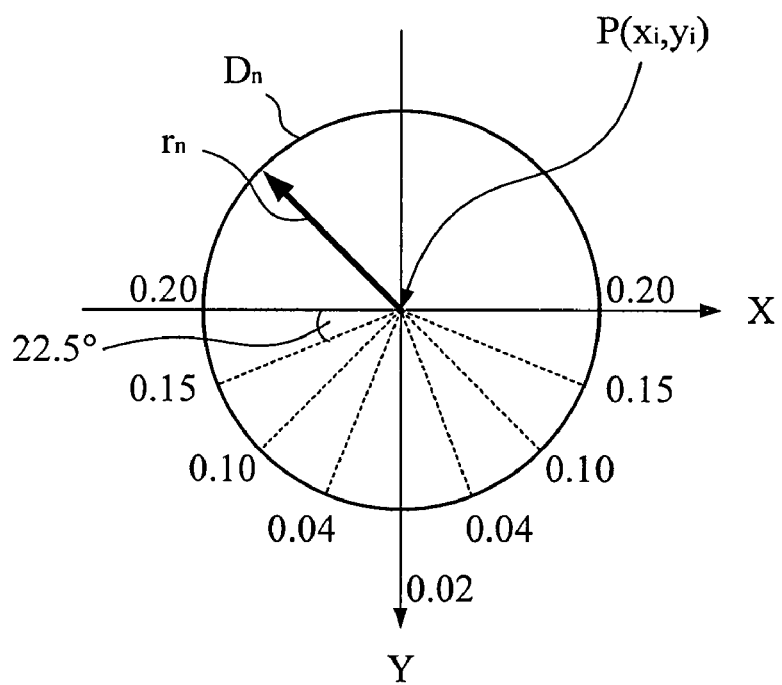
FIG. 6 schematically illustrating the definition of weighting factors in the hypothetical circular template according to the invention.

In the integration process of the energy function according to the embodiment, one sampling point on the periphery is selected every 22.5° (i.e. the increment is 22.5°) along the lower half periphery of the hypothetical circular template $D_n$ (i.e. from 0° to 180°) in order to calculate $\phi(S)$, where $E_g$ is an accumulative summation of the selected nine sampling points ((180÷22.5)+1=9). It is noted that w(s) is a weighting factor of the sampling point for estimating the importance of the sampling point so that the sampling points located on the same hypothetical circular template $D_n$ would be defined with different weighting factors. Preferably, the sampling points close to the horizontal direction would be defined with higher weighting factors, otherwise, the sampling points close to the vertical direction would be defined with smaller weighting factors because irises may be covered by eyelids. With reference to FIG. 6, there is shown the definition of weighting factors. Two sampling points on the x-axis (i.e. the horizontal direction) both have the weighting factor defined as "0.2", while other sampling points would have smaller weighting factors the more closer to the y-axis (i.e. the vertical direction). Further, the definition of weighting factors may differ according to the number of sampling points. The summation of all weighting factors of sampling points is "1.0", and thus |C| (the normalized divisor) of the energy function is also defined as "1.0".

After all energies of pixels with various hypothetical circular template $D_n$ in the searching regions R1, R2 are calculated by the image-process device, energies of pixels with each identical hypothetical radius $r_n$ would be respectively processed. That is, pixels with the same hypothetical radius having energies greater than a predetermined threshold are recorded as iris candidates (step S203). Then, the pixel having the maximal energy from the above pixels is recorded as a first iris candidate under the hypothetical radius $r_n$ (step S204).

Next, the image-process device detects a plurality of associated iris pairs from the foregoing iris candidates (step S205). In addition to irises, other similar dark regions in the face image 3, such as glasses, eyebrows, and hair, may also influence the recognition result. Therefore, the comparison between every two iris candidates is required for detecting the associated upper and lower iris candidates as the iris pairs, such as the combination of eyebrow/iris, glasses/iris, hair/eyebrow, or iris/eye socket in the face image 3. It is noted that in each iris pair, the lower iris candidate is assumed to be a possible iris in this embodiment.

Figure 7:
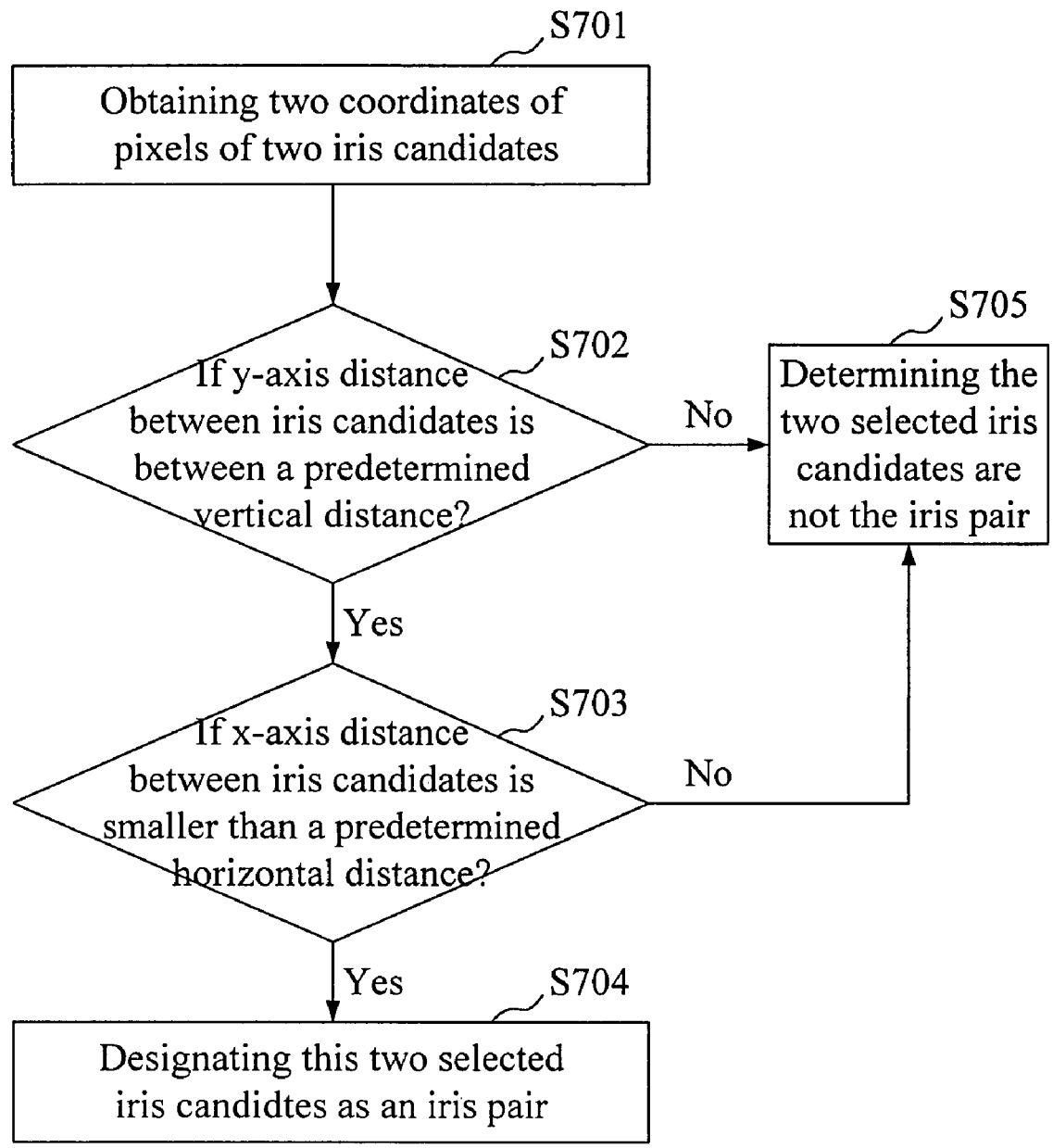
FIG. 7 is a flow chart illustrating a process of comparing iris candidates according to the invention.

With reference to FIG. 7, there is shown a process of the comparison between two of the iris candidates mentioned in step S205. At first, two coordinates of pixels of two iris candidates in the same searching region are obtained (step S701). For example, coordinates $(x_1, y_1)$ and $(x_2, y_2)$ of pixels $P_1$, $P_2$ corresponding to two iris candidates are obtained. Then, the image-process device detects that $P_2$ is below $P_1$ (in the y-axis direction), and the vertical distance between $P_1$ and $P_2$ is between $2.0 \times r_n$ and $6.0 \times r_n$ (namely, the predetermined vertical distance) (step S702). The image-process device further detects that the horizontal distance between $P_1$ and $P_2$ is smaller than $2.0 \times r_n$ (namely, the predetermined horizontal distance) (step S703). Next, this two iris candidates would be designated as an iris pair (step S704). Otherwise, if the two selected iris candidates cannot satisfy the requirements of steps S702 and S703, the iris candidates are not associated with each other and thus it is not necessary to designate the iris pair (step S705). Certainly, the definition of either the predetermined vertical distance or the predetermined horizontal distance is not limited to the scope of the disclosed embodiment and can be defined according to users.

With reference to FIG. 2 again, after all iris pairs are obtained, the lower iris candidate from the iris pairs having the maximal energy of iris pairs is recorded as a second iris candidate (step 207).

The proceeding process is to select a best iris candidate from the first iris candidate and the second iris candidate having the same hypothetical radius $r_n$. If the distance between the first iris candidate and the second iris candidate is larger than a predetermined distance (step S208), such as the hypothetical radius $r_n$, and the energy of the first iris candidate is a predetermined multiple of the energy of the second iris candidate (step S209) (e.g. the energy of the first iris candidate is 1.5 times of that of the second iris candidate), the second iris candidate is the less possible location of the actual iris. Therefore, the first iris candidate is designated as the best iris candidate under its hypothetical radius $r_n$ (step S210). On the contrary, in step S208, if the distance between the first iris candidate and the second iris candidate is less than the hypothetical radius $r_n$, the second iris candidate not only is associated with its upper iris candidate, but also much closer to the first iris candidate in the hypothetical circular template $D_n$. Thus, the second iris candidate is designated as the best iris candidate under its hypothetical radius $r_n$ (step S212).

In addition, in step S206, if none of the associated iris pairs is detected from the iris candidates, the first iris candidate is directly designated as the best iris candidate (step S211).

Figure 8:
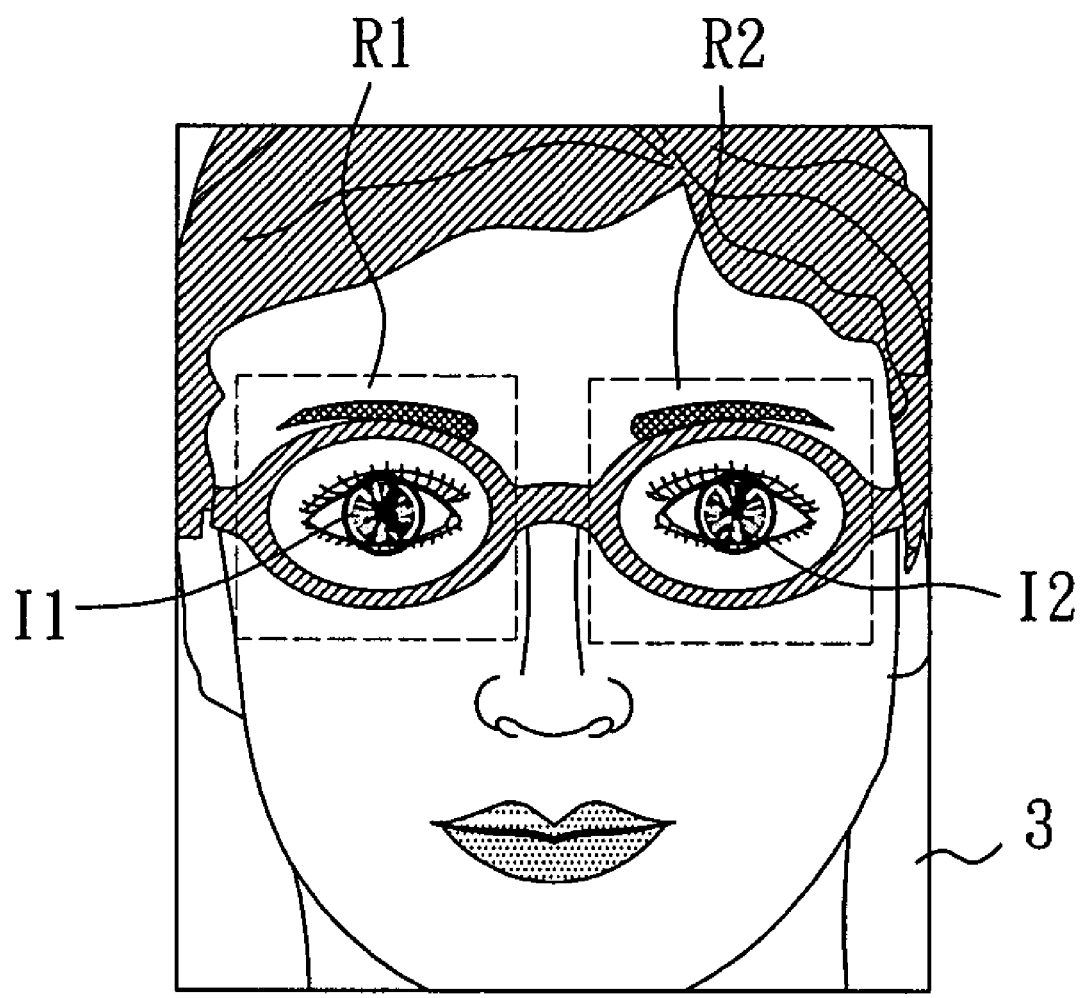
FIG. 8 is a schematic drawing of positions of irises determined in the face image according to the invention.

Finally, the best iris candidate having the maximal energy of all best iris candidates with different hypothetical radius between the minimal radius $r_1$ and the maximal radius $r_2$ is designated as the position of an iris (step S213). According to the aforesaid steps, positions of irises I1, I2 as shown in FIG. 8 can be respectively determined in searching regions R1, R2 of the face image 3, and the size of each iris is that of the hypothetical circular template corresponding to the finally selected iris candidate.

In the present invention, the iris extraction method is improved on the basis of the circular DTM technique, and uses a redesigned energy function and the way of measurement according to conventional DTM technique so as to define a robust method. Therefore, irises are easily extracted under various kinds of face images. Besides, the process of comparison between iris candidates to detect associated iris pairs is also designed in the present invention so as to select the actual iris in imperfect face images, and thus reduce the interference of other objects.

Although the present invention has been explained in relation to its preferred embodiment, it is to be understood that many other possible modifications and variations can be made without departing from the spirit and scope of the invention as hereinafter claimed.

What is claimed is:

1. An iris extraction method comprising the steps of:
   (A) defining two searching regions in a face image, wherein each searching region is a rough position of an eye for locating an iris;
   (B) measuring an energy of each pixel within the searching region according to a deformable template match (DTM) algorithm and an energy function, wherein each pixel is a center of a plurality of hypothetical circular templates, each having a hypothetical radius between a maximal radius and a minimal radius, for measuring the energies of the hypothetical circular templates in the face image;
   C) recording the pixels with the same hypothetical radius having energies greater than a threshold as iris candidates, and recording a pixel having the maximal energy from the iris candidates as a first iris candidate;
   (D) comparing two of the iris candidates in each searching region for detecting a plurality of associated iris pairs, and recording the lower iris candidate having the maximal energy of the iris pairs as a second iris candidate;
   (E) selecting the pixel corresponding to the second iris candidate as a best iris candidate if the distance between the first iris candidate and the second iris candidate is smaller than a predetermined radius; and
   (F) designating the best iris candidate having the maximal energy of all best iris candidates with different hypothetical radius as an iris in the face image.

2. The method as claimed in claim 1, wherein in step (B), the energy function is:

$$Eg = \frac{1}{|C|} \oint_C \phi(S) ds,$$

where C is a periphery of the hypothetical radius, ds is an increment of the periphery along the hypothetical circular template, $\phi(S)$ is a measurement value of a sampling point on the periphery, |C| is the perimeter of the hypothetical circular template.

3. The method as claimed in claim 2, wherein the measurement value of the sampling point is: $\phi(S)=1.5\phi_e(S)+\phi_g(S)$, where $\phi_e(S)=w(s)(g_o-g_i)$ is a measurement value of a contrast between an outer intensity and an inner intensity of the periphery of the hypothetical circular template, $\phi_g(S)=0.1\times(255-g_i)$ is a measurement value of the inner dark degrees of the hypothetical circular template, $g_i$ is a gay-scale mean of the image inside a scanning line with the length equal to the hypothetical radius, $g_o$ is a gray-scale mean of the image outside the scanning line, w(s) is a weighting factor of the sampling point, $\phi(S)$ is a weighting summation of $\phi_e(S)$ and $\phi_g(S)$.

4. The method as claimed in claim 3, wherein in the integration process of the energy function, one sampling point on the periphery is selected every N degrees along the lower half periphery of the hypothetical circular template for calculating $\phi(S)$, where the energy function is an accumulative summation of sampling points, w(s) is a weighting factor of the sampling point, N depends on the number of sampling points.

5. The method as claimed in claim 4, wherein the summation of all weighting factors of sampling points is 1, and |C| is 1.

6. The method as claimed in claim 4, wherein the number of sampling points is ((180÷N)+1).

7. The method as claimed in claim 1, wherein in step (D), the pixel corresponding to the first iris candidate is selected as the best iris candidate if none of the associated iris pairs is detected.

8. The method as claimed in claim 1, wherein in step (D), the comparison between two of the iris candidates comprises the steps of:
   (D1) obtaining two coordinates of the pixels of two iris candidates;
   (D2) detecting a vertical distance between the y-axis coordinates of the iris candidates smaller than a predetermined vertical distance; and
   (D3) detecting a horizontal distance between the x-axis coordinates of the iris candidates smaller than a predetermined horizontal distance.

9. The method as claimed in claim 1, wherein step (E) further comprises the steps of selecting the best iris candidate if the distance between the first iris candidate and the second iris candidate is greater than the predetermined radius;

(E1) detecting whether the energy of the first iris candidate is a predetermined multiple of the energy of the second iris candidate, and if yes, performing step (E2), otherwise designating the second iris candidate as the best iris candidate; and (E2) designating the first iris candidate as the best iris candidate.

* * * * *